US009137656B2

(12) United States Patent
O'Leary

(10) Patent No.: US 9,137,656 B2
(45) Date of Patent: Sep. 15, 2015

(54) SYSTEM AND METHOD FOR REMOTE PROVISIONING OF EMBEDDED UNIVERSAL INTEGRATED CIRCUIT CARDS

(71) Applicant: Rogers Communication Inc., Toronto (CA)

(72) Inventor: Edward A. O'Leary, Ajax (CA)

(73) Assignee: Rogers Communications Inc., Toronto (CA)

( * ) Notice: Subject to any disclaimer, the term of this patent is extended or adjusted under 35 U.S.C. 154(b) by 285 days.

(21) Appl. No.: 13/802,872

(22) Filed: Mar. 14, 2013

(65) Prior Publication Data

US 2014/0004827 A1 Jan. 2, 2014

Related U.S. Application Data

(60) Provisional application No. 61/665,109, filed on Jun. 27, 2012.

(51) Int. Cl.
| | | |
|---|---|---|
| H04M 1/66 | (2006.01) | |
| H04M 1/68 | (2006.01) | |
| H04M 3/16 | (2006.01) | |
| H04W 8/22 | (2009.01) | |
| H04W 12/04 | (2009.01) | |
| H04W 8/18 | (2009.01) | |

(52) U.S. Cl.
CPC ............... *H04W 8/22* (2013.01); *H04W 8/183* (2013.01); *H04W 12/04* (2013.01)

(58) Field of Classification Search
CPC ..... H04W 12/04; H04W 12/06; H04W 8/265; H04W 8/205; H04W 8/245; H04W 8/18; H04W 8/22; H04W 8/183

USPC ................................................... 455/411
See application file for complete search history.

(56) References Cited

U.S. PATENT DOCUMENTS

| | | | |
|---|---|---|---|
| 2008/0108321 A1* | 5/2008 | Taaghol et al. ............... 455/410 |
| 2008/0170697 A1* | 7/2008 | Heinonen et al. ............ 380/277 |
| 2008/0311956 A1* | 12/2008 | Taaghol ........................ 455/558 |
| 2009/0191857 A1 | 7/2009 | Horne et al. |
| 2009/0205028 A1* | 8/2009 | Smeets et al. .................... 726/6 |

(Continued)

FOREIGN PATENT DOCUMENTS

WO 2012076425 6/2012

OTHER PUBLICATIONS

EPO, Extended European Search Report relating to application No. 13159144.8 dated Oct. 8, 2013.

(Continued)

*Primary Examiner* — Nathan Mitchell
(74) *Attorney, Agent, or Firm* — Rowand LLP

(57) ABSTRACT

Methods and devices are described for provisioning embedded universal integrated circuit cards (EUICCs). A certification server may store records for each EUICC containing provisioned profile data. A regulatory domain server may govern a regulatory domain containing a plurality of mobile network operators (MNOs) and may assist with provisioning wireless devices containing EUICCs. The EUICC may store a hierarchy of profiles, including a device profile, a regulatory domain profile, and/or an MNO profile. The EUICC may include a fully-qualified domain name for the certification server, the device installation server, and/or the regulatory domain server so as to trigger provisioning or re-provisioning over an IP connection.

17 Claims, 5 Drawing Sheets

(56) References Cited

U.S. PATENT DOCUMENTS

| | | | |
|---|---|---|---|
| 2010/0106967 A1 | 4/2010 | Johansson et al. | |
| 2010/0188990 A1* | 7/2010 | Raleigh | 370/252 |
| 2011/0136471 A1 | 6/2011 | Chen et al. | |
| 2011/0269461 A1* | 11/2011 | Xu et al. | 455/435.2 |
| 2012/0016989 A1 | 1/2012 | Fuller | |
| 2012/0020325 A1 | 1/2012 | Swamy et al. | |
| 2012/0115457 A1* | 5/2012 | Bouckaert et al. | 455/418 |
| 2012/0172089 A1* | 7/2012 | Bae et al. | 455/558 |
| 2012/0275442 A1* | 11/2012 | Malets et al. | 370/338 |
| 2012/0282891 A1* | 11/2012 | Mohammed et al. | 455/406 |
| 2013/0012168 A1* | 1/2013 | Rajadurai et al. | 455/411 |
| 2013/0329683 A1* | 12/2013 | Berard et al. | 370/329 |
| 2014/0057615 A1* | 2/2014 | Berry et al. | 455/418 |

OTHER PUBLICATIONS

"3rd Generation Partnership Project; Technical Specification Group Services and System Aspect; Feasibility Study on Remote Management of USIM Application on M2M Equipment; (Release 8)", 3GPP Standard; 3GPP TR 33.812, 3RD Generation Partnership Project (3GPP), Mobile Competence Centre; 650, Route Des Lucioles; F-06921 Sophia-Antipolis Cedex; France, No. V1.0.0, Sep. 1, 2008, pp. 1-80, XP050376873, p. 29, paragraph 5.2.3—p. 69.

Jean-Louis Carrara, et al.,Telecommunications, The Role of the UICC in Long Term Evolution, all IP networks, Gemalto, Jan. 2009.

Oberthur Technologies, White Paper, UICC in LTE, May 7, 2011.

Luis Barriga, et al.,Enabling M2M Device Connectivity, M2M Remote-Subscription Management, Ericsson Review, Jan. 2011.

David Maxwell, Embedded SIM—An Overview, GSMA, updated.

SIMalliance GSMA meeting Oct. 6, 2011, Agenda, Activation Rules and Remarks.

3GPP TR 33.812 v9.2.0 (Jun. 2010) Technical Report, 3rd Generation Partnership Project; Technical Specification Group Services and System Aspects; Feasibility study on the security aspects of remote provisioning and change of subscription for Machine to Machine (M2M) equipment (Release 9), 2010, pp. 1-87.

U.S. Appl. No. 13/411,700, filed Mar. 5, 2012.

* cited by examiner

SYSTEM AND METHOD FOR REMOTE PROVISIONING OF EMBEDDED UNIVERSAL INTEGRATED CIRCUIT CARDS

CROSS-REFERENCE TO RELATED APPLICATIONS

The present application claims priority to U.S. provisional patent application Ser. No. 61/665,109 filed Jun. 27, 2012, the contents of which are hereby incorporated by reference.

FIELD

The present application generally relates to radio communications, in particular, to systems and methods for remotely provisioning devices that use an embedded universal integrated circuit card.

BACKGROUND

Mobile phones and other devices that operate on public land mobile networks (PLMNs) currently contain a Subscriber Identity Module (SIM) card that specifies the mobile network operator (MNO) to which the device user is subscribed. In this manner, the device is granted appropriate access to the available network resources and billing is allocated correctly. Users are able to change their subscription to a different MNO by inserting a new SIM card, subject to possible SIM-locks implemented within the phones or networks to prevent subscription changes that undermine device-cost-subsidy plans. A SIM is technically an application that resides within what is properly termed a universal integrated circuit card (UICC).

Development is underway on an embedded UICC (EUICC), which would be an integrated circuit component soldered directly to a circuit board within a wireless device. This creates an issue because it is not possible to change the EUICC if the device owner wishes to change to a new active MNO. Current expectations are that EUICCs will be used primarily in machine-to-machine (M2M) wireless devices, although they may become prevalent in other wireless devices.

The current process for provisioning a SIM card may not be desireable for EUICC cards. As things currently stand, the SIM manufactures are accredited as "qualified" manufacturers in a certification process. Once "qualified", they are entitled to produce SIM cards. SIM cards are often pre-provisioned with "personalization" data, i.e. an active International Subscriber Mobile Identity (IMSI) associated with the MNO that has ordered the SIM card. During sale of the wireless device, the SIM card may be removed from the wireless device and re-provisioned at the point-of-sale using its hard-wired contacts to install an active user IMSI, i.e. an IMSI reflecting the actual assigned phone number and MNO under which the user has purchased service and, in many cases, the device. The MNO has a record of the subscription package associated with this IMSI, i.e. the services to which the device is entitled as a result of their subscription. A home location register (HLR) for the MNO is eventually provided with a record that enables the HLR to verify the IMSI's authenticity and the services to which it has access.

It may be advantageous to provide for systems and methods of provisioning or re-provisioning EUICCs that do not rely upon installation of an active MNO profile or donor MNO profile at the EUICC soldering stage.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
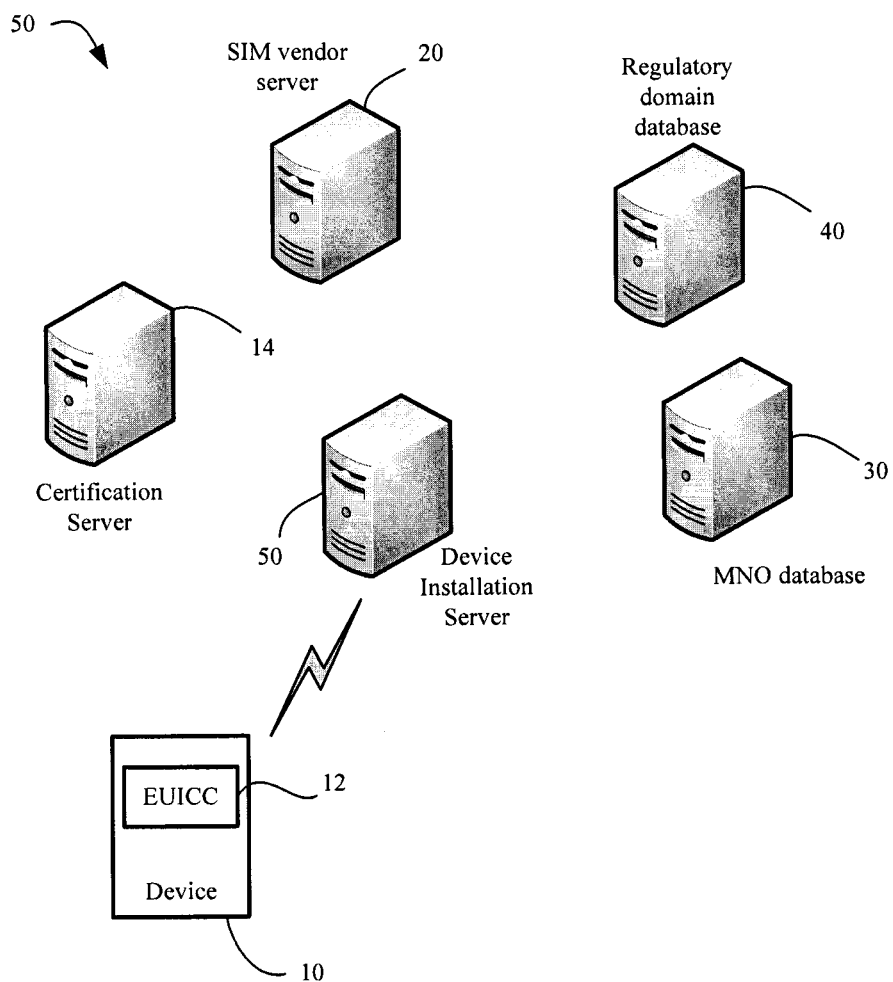
FIG. 1 shows diagrammatically shows an example provisioning system for an example wireless device containing an EUICC.

In one aspect, the present application describes method of provisioning an embedded universal integrated circuit card (EUICC) in a wireless device with an active profile, wherein the active profile corresponds to an mobile network operator (MNO) subscription for service and includes an active profile international mobile subscriber identity (IMSI) and key material, the EUICC storing a fully-qualified domain name (FQDN) that resolves to a server. The method includes establishing an IP connection between the wireless device and the server; receiving, at the server, a provisioning request from the wireless device; querying a certification server database for a record associated with the EUICC; identifying, based on the record, an MNO provisioning server for provisioning the EUICC; redirecting the wireless device to the MNO provisioning server, from which the EUICC is provisioned the active profile.

In another aspect, the present application describes a method of provisioning an embedded universal integrated circuit card (EUICC) in a wireless device with an active profile, wherein an active profile corresponds to an mobile network operator (MNO) subscription for service and includes an active profile international mobile subscriber identity (IMSI) and key material, the EUICC storing a current IMSI. The method includes receiving, at a server, a cellular connection from the wireless device having the current IMSI; determining that the current IMSI is a provisioning IMSI and not an active profile IMSI; and redirecting the wireless device to a provisioning server, wherein the provisioning server comprises one of a certification server, a device provisioning server, a regulatory domain provisioning server, and an MNO provisioning server.

In yet another aspect, the present application discloses a certification server. The certification server includes a processor; memory storing a plurality of records, each record storing a respective EUICC identifier and an associated certificate; and an authentication application stored in memory that, when executed, configures the processor to receive a query from a server regarding a wireless device containing an EUICC, the query including an identifier associated with the EUICC, select one of the plurality of records based on the received identifier matching the respective EUICC identifier, and send a reply to the server, wherein the reply includes information regarding an MNO provisioning server associated with the EUICC.

In a further aspect, the present application discloses a regulatory domain server operated by a regulatory domain operator for a regulatory domain, wherein the regulatory domain includes a plurality of mobile network operators (MNO) each having a public land mobile network. The regulatory domain server includes a processor; and a memory storing records for embedded universal integrated circuit cards (EUICCs) associated with wireless devices. The processor is configured to receive a provisioning request from a wireless device, the provisioning request including an EUICC identifier, determine whether the EUICC identifier matches one of the records stored in the memory and, if so, redirect the wireless device to a provisioning server for one of the MNOs within the regulatory domain based on the contents of the record matching the EUICC identifier, or, if not, query another server for provisioning information regarding the wireless device and receive a response thereto and redirect the wireless device based upon the response.

In yet a further aspect, the present application describes non-transitory computer-readable media storing computer-executable program instructions which, when executed, configured a processor to perform the described methods.

Other aspects and features of the present application will be understood by those of ordinary skill in the art from a review of the following description of examples in conjunction with the accompanying figures.

The present application relates to wireless network access for wireless devices. Many wireless devices may be mobile devices, such as tablets, mobile telephones, smartphones, laptops, and the like. Other wireless devices may be non-mobile devices, such as parking meters, vending machines, power-line equipment, remote sensing devices, and the like. There are a number of devices that are incorporating wireless connectivity other than conventional mobile telephones.

Wireless devices typically contain a removable Universal Integrated Circuit Card (UICC), which is often referred to as a SIM (Services Identity Module) card. The UICC is a smart card that features a CPU, ROM, RAM, and input/output contacts. The UICC runs one or more SIM applications (different applications may be resident on the UICC for connecting to different types of networks—i.e. GSM, CDMA, UMTS, etc.). The SIM application securely stores the International Mobile Subscriber Identity (IMSI) and related keys to enable access and authentication on a wireless network. The SIM application may also securely store information regarding the local network, information regarding services that the subscriber is able to access, and passwords or PINs. In some cases, the UICC may also store messaging data, such as contact information.

A user of a conventional mobile wireless device obtains the UICC from a particular mobile network operator (MNO). Based on the subscription purchased by the user, the MNO provisions the UICC with an MNO IMSI prior to distribution so that the mobile device wirelessly connects to the MNO's public land mobile network (PLMN). The user of the mobile device may change the MNO the device uses by changing the UICC. In some cases, however, an MNO may "lock" a mobile device to prevent carrier changes; particularly, where the MNO has provided the device to a user free or at a substantial discount in exchange for the user's commitment to a long-term service contract. This is typically referred to as a "SIM-lock".

Removable smart-card-based UICCs are expected to be replaced by embedded UICCs (EUICCs), which are soldered directly onto the circuit board within a wireless device. Expectations are that EUICCs may be particularly common in non-conventional wireless devices engaged in Machine-to-Machine (M2M) communications such as, for example, smart meters, automobiles, m-health cards or devices, various monitoring or tracking devices, etc. The EUICC may end up being the de facto technology used in most, if not all, wireless devices, including mobile devices such as smart phones, mobile telephones, tablets, and other user-centric devices. As noted above, the EUICC may also be embedded in non-mobile devices to enable those devices to engage in communications normally considered "mobile" communications.

Embedding the EUICC presents a challenge to conventional UICC technology in that the EUICC cannot simply be removed and replaced in order to change the MNO that the device uses to access wireless services. Also, the EUICC is affixed to a single device at the device factory. In the past, a set of UICCs may be manufactured and sent to a particular MNO. This meant that the UICCs could be pre-loaded with MNO IMSIs in some cases. In other cases, the UICCs may not be pre-loaded and may be provisioned by an MNO when a corresponding device is sold over-the-counter, but this requires that the MNO personnel extract and actively provision the UICC at the point-of-sale of the device/UICC. With EUICCs, the device manufacturer obtains EUICCs and solders them into the devices prior to distribution. Pairing a pre-provisioned EUICC with a specific device intended for distribution to an MNO that matches the provisioning on the EUICC may be difficult. In some cases, this may be addressed by provisioning the EUICC as it comes off the assembly line using the EUICC contacts or short-range communications, like NFC or the like, but this requires that the device be pre-destined for a particular country and, in many cases, a particular MNO. Some manufacturers may want to allow for more flexibility.

The term "provisioning" as used herein refers to the loading or storing of a subscriber profile in memory on the EUICC. The subscriber profile is an "active profile" if it is specific to an MNO and includes an MNO IMSI and related keying material (e.g. Ki value). The subscriber profile also typically includes a file structure that defines parameters necessary for operating on the MNO's wireless network and may include an authentication key. Other keys and parameters may be included in a "provisioned" profile for an EUICC. In some cases, the provisioning of an EUICC with an active MNO profile may be referred to as "personalization".

The present application proposes a system architecture, servers and methods that enable the remote provisioning and management of EUICCs.

Reference is first made to FIG. 1, which diagrammatically shows an example provisioning system 50 for an example wireless device 10 containing an EUICC 12. The provisioning system 50 may include at least one certification server 14 and one or more SIM vendor servers 20 (although "SIM" refers generally to the software on the EUICC, the manufacturers/vendors of EUICC devices are referred to herein as SIM vendors). Each authorized or certified SIM vendor may have one or more of its own servers 20 for communicating with the certification server 14 in order to certify EUICCs that it has manufactured. Other elements of the system 50 may include one or more device installation servers 16, one of which is shown. The device installation server 16 includes a device database. The system 50 also includes the networks of a plurality of MNOs. Each MNO network includes an MNO database 30 (although for simplicity one is shown, the MNO database 30 may be implemented as a plurality of linked distributed databases). A collection of MNO networks common to a regulatory domain, e.g. a country, in some cases, may also have a related regulatory domain database 40 operated and maintained by a regulator for the domain. The regulator may be government regulator, a consortium of the relevant MNOs, or some other entity charged with operating the regulatory domain database 40 for the region.

The certification server 14 certifies EUICCs for SIM vendors. In particular, a SIM vendor server 20 connects to the certification server 14 to request certification of an EUICC 12 (or, a batch of EUICCs). The certification server 14 authenticates the SIM vendor server 20 as being associated with an authorized SIM manufacturer and provides the SIM vendor server 20 with some basic data for provisioning the EUICC 12. The basic provisioning data from the certification server 14 may include an certification token. The SIM vendor provides the certification server 14 with the EUICC identification (ID) number or code. This may be a serial number uniquely identifying the EUICC 12.

The certification server 14 stores a record for each certified EUICC 12 that contains the EUICC ID number and the assigned certification token. In some cases it may contain other data, some examples of which are provided below.

The SIM vendor server 20 may provision the EUICC 12 with the certification token, its EUICC ID number (if not already stored in non-volatile memory on the EUICC 12). It may also provision the EUICC 12 with a fully-qualified domain name (FQDN) for the certification server 14. This will allow the EUICC 12 to reach the certification server 14 in the future to be authenticated and, if necessary, to trigger further provisioning or re-provisioning of the EUICC 12 by other layers/entities in the system 50.

As will be described below, the record for each EUICC 12 maintained by the certification server 14 may be updated from time-to-time as the EUICC 12 is further provisioned with profile data, whether by a device manufacturer, a regulatory domain operator, a donor MNO, or an active MNO. The certification server 14 may, in some implementations, remove expired or de-authorized profile data from the record for an EUICC 12.

The certification of the EUICC 12 may occur post-installation from the device factory. In such a case, the device installation server 16 may contact the SIM vendor server 20 and certification server 14 to initiate the certification process.

Irrespective of whether certification occurs before or after embedding of the EUICC 12 in the device 10, the device installation server 16 may provision the EUICC 12 with a profile. The profile installed by the device installation server 16 may be a device-level profile in cases where the device 10 is not designated for a particular regulatory domain and/or MNO. A device-level profile may provide the EUICC 12 with an international mobile station identity (IMEI), keying material, and a device FQDN. The device FQDN may point to the device installation server 16 or another such server associated with the device manufacturer for provisioning/managing device profiles.

In some example embodiments, the device-level profile may also include allocation of a device International Mobile Subscriber Identity (IMSI). This IMSI is not specific to a country. That is the mobile country code (MCC) and/or mobile network code (MNC) within the IMSI are a unique code assigned to the device manufacture or SIM vendor. The fact that the EUICC 12 has been provisioned with a device IMSI also serves as notice that the device is not provisioned with an MNO profile—i.e. it requires further provisioning before it is able to freely access mobile networks—and it associates the device with a given manufacturer and/or SIM vendor. In one example, the MCC is set to a predefined code, like 999, that is not associated with a country and the MNCs are assigned to individual SIM vendors. Yet another MCC (or more than one) may be predefined as being for vendors, and the MNCs for that MCC may point to individual device vendors.

In some implementations, the device-level profile (or other profile) may be stored on and provisioned by the SIM vendor server 20 with the device installation server 16 acting as proxy.

In some cases, the device installation server 16 may be able to provision the EUICC 12 with a more specific profile. For example, it may know the country and/or regulatory domain to which the device 10 will be sent. In this case, the device installation server 16 itself, or as proxy, may install a regulatory domain profile. This type of profile is not an MNO-level profile, but rather is more specific than a device-level profile. It may provide the EUICC 12 with a regulatory domain server FQDN, for example the regulatory domain database 40 or a related server.

The regulatory domain profile may further include keying material and, in some cases, a regulatory domain IMSI. The regulatory domain IMSI may include an MCC and/or MNC code specific to the regulatory domain. Like the device-level IMSI, the regulatory domain IMSI is not an "active" IMSI with which the device is able to operate normally on mobile networks, but rather is a "provisioning" IMSI that, in some implementations, may trigger a provisioning operation when the device connects to a mobile network, as will be explained further below.

In both cases (device-level profile and regulatory domain profile) the provisioning server updates the certification server 14 with the profile data. That is, the certification server 14 maintains a record specific to the EUICC 12 that reflects the current provisioned profile information and, in some embodiments, a hierarchy of provisioned profile information. In the latter case, the certification server 14 maintains profile information at the certification or SIM vendor level, the device level, the regulatory domain level, and/or the MNO level, if any such profiles have been provisioned to the EUICC 12. The profile at a given level may be overwritten if the EUICC 12 is re-provisioned (keeping in mind that re-provisioning at a higher level, like device-level, will necessarily invalidate profiles at the lower level, like MNO-level, at the same time). Re-provisioning and restrictions on re-provisioning are described later below.

In some cases, the EUICC 12 may be provisioned with a donor MNO profile or an active MNO profile. An active MNO profile is associated with a specific MNO and a subscription package that defines the device's access credentials and entitlements with respect to mobile network communications. The MNO profile has an MNO IMSI and associated keying material. The EUICC 12 may also be provided with an MNO FQDN in the MNO profile, such as a FQDN pointing to the MNO database 30 or a similar server.

A donor MNO profile is a concept created for EUICCs 12. The donor MNO profile is an actual active MNO profile, as described above, but may, through business arrangements, be intended to be temporary. For example, the device manufacturer may have a relationship with a designated MNO that serves as an initial MNO. In another example, several MNOs in a consortium may designate one of them to serve as the initial MNO. When a donor MNO profile is installed in the EUICC 12, the device containing that EUICC 12 will function normally on an MNO network. When activated, it will seek and obtain services on the MNO network and it may appear to be roaming (if not the same MNO as the donor MNO profile).

In some cases, one of the above-described types of profiles may be installed at the device factory: device-level profile, regulatory domain profile, or MNO profile (donor or otherwise). The device-level profile and regulatory domain profiles may be termed "provisioning profiles" since they are not active MNO profiles. Moreover, a donor MNO profile may also be termed a "provisioning profile", although it is specific to an MNO and is capable of functioning as an active profile. In some cases, mechanisms may be implemented in the networks to try to recognize an active MNO profile as a donor profile and thereby treat it as a "provisioning profile".

The provisioning of profiles may additionally or alternatively occur at other points in the distribution process, such as at the point-of-sale or in the after-market. Other servers may proxy the provisioning function and contact the certification server 14 or any other servers required for provisioning the EUICC 12 with a particular profile, including the device installation server 16, the SIM vendor server 20, a regulatory domain server, or an MNO server.

The certification server 14, which maintains up-to-date records for certified EUICCs and the various profiles that have been provisioned to those EUICCs, is illustrated in FIG. 1 as a single device for simplicity. Nevertheless, it will be understood that the certification server 14, and other servers shown in FIG. 1, may be implemented using multiple servers, server farms, distributed databases, redundant back-up servers, etc.

Figure 2:
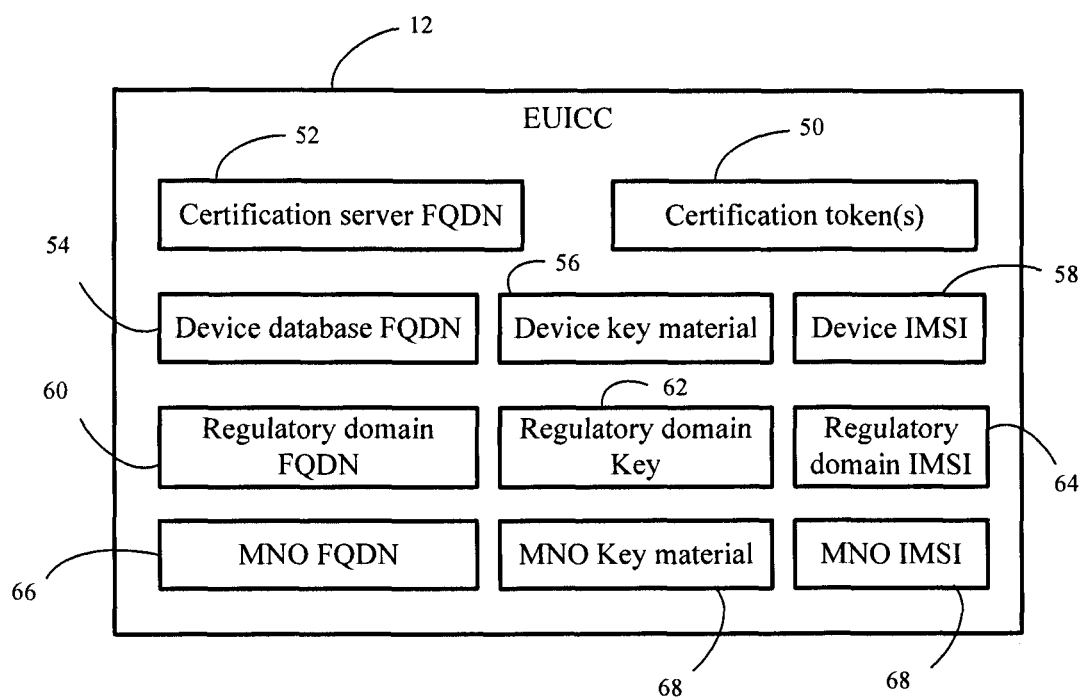
FIG. 2 shows a block diagram of an EUICC memory.

Reference is now made to FIG. 2, which shows, in block diagram form, an example EUICC 12. The EUICC 12 in this example has been provisioned with a number of profiles. Initially, the EUICC 12 is certified by the certification server 14 (FIG. 1) and is provide with certification token(s) 50 and the certification server FQDN 52. On device installation, the EUICC 12 is provisioned with a device database FQDN 54. It may also, in some cases, be provided with device-level key material 56 and, in some embodiments, a device-level IMSI 58.

In this example, the EUICC 12 has also been provisioned with a regulatory domain FQDN 60. This may be further associated with a regulatory domain key 62 and, in some cases, a regulatory domain IMSI 64. The EUICC 12 has further been provisioned with an MNO FQDN 66 and MNO key material 68. Having been provisioned by an MNO with an active MNO profile, the EUICC 12 now has an MNO IMSI 70.

The profiles stored in the EUICC 12 are hierarchical. The EUICC 12 is configured to attempt to use the most particular of the profiles to obtain services on the wireless network. For example, when an active MNO profile has been provisioned to the EUICC 12, then the EUICC 12 uses this active profile for communications with wireless networks. In the event that that profile is invalidated, de-activated, or otherwise refused by the wireless network, the EUICC 12 may be configured to use the next most particular FQDN (and, if necessary, key material) in the stack of profiles to trigger or request the provisioning of a new active MNO profile. In the case where a regulatory domain FQDN 60 is stored on EUICC 12, the EUICC 12 requests access to that regulatory domain FQDN 60 once an IP connection has been obtained, whether over a public land mobile network (PLMN), e.g. cellular, or over wireless local access network (WLAN), e.g. a WiFi access point. In the event the device is unable to obtain an IP connection over the cellular network due to the invalid or de-activated MNO profile, it may rely on WiFi or other short-range wireless communications to obtain IP connectivity through a suitable access point in order to contact the regulatory domain FQDN 60.

If no regulatory domain FQDN 60 is stored on the EUICC 12, then it may request access to the device-level FQDN 54, or if that is not available, the certification server FQDN 52.

Any of these FQDN 52, 54, 60 end-points may refer the EUICC 12 to another server for provisioning or further redirection. For example, the regulatory domain FQDN 60 may result in contact with a regulatory domain server that consults the regulatory domain database 40 (FIG. 1) and authenticates the EUICC 12. It may then apply any suitable routing policies for referring the EUICC 12 to one of the MNOs within the regulatory domain for provisioning of an active MNO profile. If the EUICC 12 cannot be authenticated, it may send a refusal message to the device and/or it may refer the EUICC 12 to the applicable device database or certification server 14. In this manner, the EUICC 12 contains the domain information for reaching back to various points in the provisioning architecture in order to trigger or request re-provisioning, including as far back as the certification server 14. The certification server 14 maintains a record of all provisioning for the EUICC 12, thereby enabling the certification server 14 to play a role in authenticating or authorizing provisioning/re-provisioning requests and/or managing the re-provisioning process.

Figure 3:
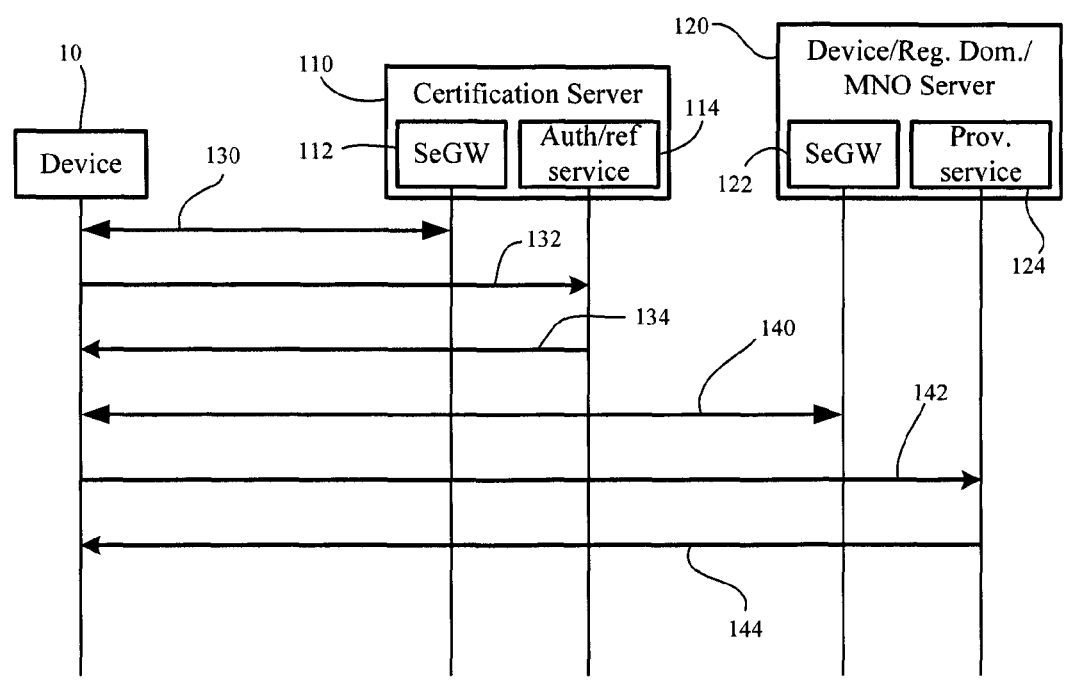
FIG. 3 shows a signal diagram illustrating one example process for provisioning an EUICC.

Reference is now made to FIG. 3, which shows a signal diagram 100 for provisioning an EUICC 12 in a device 10. As described above, the EUICC 12 initially is provisioned with, at least, a certification server FQDN. The device 10 obtains an IP connection, for example through WiFi or any other wired or wireless connection through which an IP connection may be established, and contacts the certification server FQDN to reach a certification server 110. The device 10 establishes a secure connection 130, such as an IPSec tunnel, with a security gateway 112 in the certification server 110. The device 10 may then send the certification server 110 a request 132 to be provisioned with a profile.

The certification server 110 may include an authentication/referral service 114 for authenticating device requests and referring them to suitable servers for provisioning. In some cases, the request 132 (illustrated as a single request, although in some cases the device 10 and server 110 may exchange multiple communications as part of the request) may include contextual data from the device 10 that assists the authentication/referral service 114 in redirecting the device 10. For example, the contextual data may, in some embodiments, include geo-location data, if available, RF parameters or data, including cell tower information, or other such data. The contextual data helps the authentication/referral service 114 identify whether the device 10 should be redirected to a particular regulatory domain server, MNO server, etc. For example, the contextual data may inform the authentication/referral service 114 that the device is in a particular country or a particular city. That information may be used to route the device request to a particular server for further provisioning decisions.

In some embodiments the certification server 110 may already have redirection information for the device 10. For example, upon initial provisioning of the EUICC 12 with the certification server FQDN, the end destination for the EUICC 12 or the device 10 may have been unknown. In the meantime, the certification server 110 may have received updated information regarding the MNO or regulatory domain to which the device/EUICC 10, 12 are associated, and that information may be stored in the EUICC 12 record maintained by the certification server 110. When the device 10 later connects and requests provisioning, the certification server 110 may therefore already know to which other server the device request should be redirected.

The authentication/referral service 114 refers the device 10 to another server for provisioning, as indicated by reference numeral 134. As a result, the device 10 contacts a provisioning server 120, such as a device-level server, regulatory-domain server, or MNO server, as examples. The provisioning server 120 and device 10 establish a secure connection

140, such as an IPSec tunnel, via a security gateway 122 in the provisioning server 120. The device 10 then sends its request for provisioning 142 to the provisioning server 120, and in particular to a provisioning service 124 implemented within the provisioning server 120. In response, in this example, the provisioning server 120 provisions the device 10 with profile data 144 for installation in the EUICC 12.

In another embodiment (not illustrated), the certification server 110 itself, or a proxy, may have been provided with the active MNO profile that is intended to be associated with and installed on the EUICC 12, and the certification server 110 may itself (or through a proxy) install the profile on the EUICC 12.

Note that in some other embodiments, instead of first contacting the certification server 110, the device 10 may have a FQDN for another entity, such as an MNO server, device server, SIM vendor server, or regulatory domain server. These servers may be configured to contact (perhaps as proxy) the certification server on behalf of the device 10 in order to authenticate the EUICC 12 and obtain redirection/provisioning instructions, if any. These servers may further request information from other servers, including device or SIM vendor servers.

Figure 4:
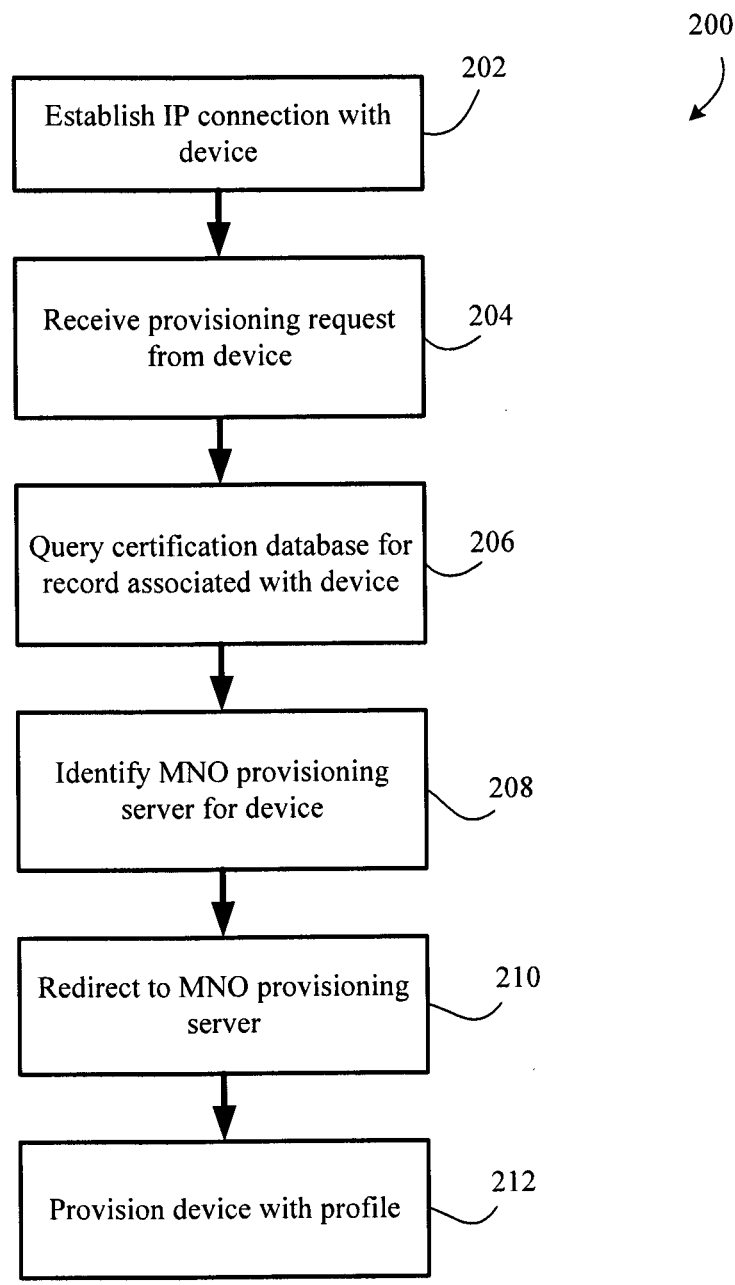
FIG. 4 shows, in flowchart form, another example method for provisioning an EUICC.

Reference is now made to FIG. 4, which shows, in flowchart form, an example process 200 for provisioning an EUICC. The process begins when the device establishes an IP connection with the server corresponding to a FQDN stored in the EUICC, as indicated by operation 202. This server may be an MNO server, a regulatory-domain server, a device-level server, or another type of server, e.g. SM-SR. The IP connection may be established over WiFi, NFC, or other short-range data connection.

In operation 204, the server receives a provisioning request from the device. The provisioning request may include data stored in the EUICC, including current non-active profile information. The provisioning request may also include contextual data, such as geo-location data, or local MNO data obtained via radio scanning.

The server may, in operation 206, query the certification database for a record corresponding to the EUICC. In some cases, the server may refer/redirect the wireless device to the certification server. In this example, the server requests and obtains information from the certification server. The server may authenticate the EUICC based on information received from the certification server. In some cases, the information provided by the certification server may specify an MNO or regulatory domain to which the wireless device/EUICC is associated and to which it should be redirected. In some other cases, the certification server may not provide information regarding an associated MNO or regulatory domain. In the latter situation, the server may rely upon contextual data provided by the wireless device and/or regulatory policy and rules for identifying an MNO and/or regulatory domain to which the wireless device belongs. In some cases, the server may query one or more regulatory domain or MNO servers to determine whether the wireless device is associated with that domain or MNO. In any of these situations, as indicated by operation 208, the server identifies an MNO provisioning server.

Operation 208 may include identifying a server with the associated MNO that is local to the wireless device, based upon contextual data provided by the device. In one example, operation 208 may include redirecting the request to an MNO server, which then identifies the MNO provisioning server to which to refer the device on the basis of the contextual data.

In operation 210, the wireless device is redirected to an MNO provisioning server. This may include providing the wireless device with an FQDN for the MNO provisioning server. The wireless device may then establish a secure connection, such as an IPSec tunnel, with a security gateway of the MNO provisioning server. The MNO provisioning server then, in operation 212, provisions the EUICC with an active MNO profile.

Note that if the server is an MNO server then, in some examples, it may install an active profile without further redirection. In some other cases, if the server is a donor MNO server, then it may install an active profile if the device is to remain with the MNO, refer the device to another MNO, or redirect the device to a regulatory domain server. If the server is a regulatory domain server, then it may redirect the device to an MNO within the domain for obtaining a subscription and installing a profile.

Referring again to FIG. 1, example processes for re-provisioning the EUICC 12 will now be described. The re-provisioning may be initiated over an IP connection or over an air interface. In some embodiments, an IP connection may be required for finalizing transactions.

In a first example process, the EUICC 12 contains an active MNO profile, but the owner/user initiates a change request offline. That is, the change request is not implemented via the device 10 itself, but rather through an in-store or web-based transaction with a new MNO. The user/owner of the device 10 initiates the transaction by contracting for subscription services with the new MNO. These first example processes describe re-provisioning processes managed by the MNOs/network(s).

The new MNO registers the requested change with another entity in the system 10, such as the old MNO and/or the regulatory domain database 40. Processes are in place to authenticate the requested change. For example, business rules may govern whether the change is permitted, such as whether there are outstanding payments owed to the old MNO or whether a device-cost-subsidy buyout is required or whether an existing contract with the old MNO requires a cancellation payment, etc. The old MNO may have one or more servers configure to receive and authorize (or reject) requests from new MNO servers relating to change requests. In one embodiment, the regulatory domain operator (via one or more regulatory domain servers) manages or negotiates these authorizations as intermediary between the various MNOs.

Assuming that the change is authorized, then the new MNO profile may be provisioned to the EUICC 12 in a number of ways. In a first example, the device may be instructed by the regulatory domain server, or old MNO server, or new MNO server or other such server, to access a provisioning server (which may include any of the above servers) to be provisioned with the new MNO profile. The instruction to the device 10 may be communicated over-the-air (OTA) using a data connection authorized by the old MNO profile, or over an IP connection using WiFi or the like.

In another example, the old MNO may be configured to detect the OTA connection of the device using the old MNO profile and may be configured, for example at the HLR level, to restrict the device's access to services to connecting with a provisioning server. The provisioning server may include a regulatory domain server, a new MNO server, or an old MNO server that has been provided with the MNO profile for installation in the EUICC 12.

In a third example, in some cases the old MNO profile may simply be deactivated such that when the device 10 connects to the old MNO network and HLR is it unable to authenticate and obtain services. As a result, it may seek provisioning using the next most specific FQDN with which it has been provisioned, e.g. a regulatory domain server FQDN. Accordingly, the device 10 may connect to the regulatory domain server FQDN (or the like) using an IP connection over WiFi or other IP connectivity. Depending on the profiles provisioned to the EUICC 12, it may contact the regulatory domain database 40, the device installation server 50, the SIM vendor server 20 or the certification server 14 for provisioning of the new MNO profile. In some cases, the server contacted may refer the device 10 to a provisioning server operated by the new MNO for installation of the new MNO profile.

In a variation to the foregoing processes, the change in MNO may not be initiated by the user, but rather may result from a reassignment of the subscriptions from the old MNO to the new MNO, for example as a result of acquisition of some or all of the old MNO's business. Transfer of subscriptions from one MNO to another may occur for other reasons as well. The foregoing processes may be used to facilitate the change in MNO for each subscribed by automatically updating the active MNO profile for their device(s).

In a second example process, the change in MNO is initiated by a command from the device 10. In one embodiment, the device 10 may include an application or process that enables user selection of a new MNO and subscription plan. Using an interface on the device 10, the user may request a new subscription and new MNO. That change request received by the device 10 may trigger a change command request to a current MNO server and/or to an intermediary server, such as a regulatory domain server. The change command may be send OTA in some embodiments. In another embodiment, the change command may be implicitly made by requesting access to an FQDN associated with re-provisioning. In some cases, the FQDN may include one or more of the FQDNs provisioned to the EUICC 12, such as the regulatory domain FQDN 60, the device database FQDN 54, and/or the certification server FQDN 52. In some instances, the device 10 may send selected subscription information to the FQDN, which in some cases may include the identity of the newly-selected MNO.

As above, processes may be put in place for authorizing a change request. For example, the old MNO may need to authorize the change in accordance with business rules regarding outstanding accounts, SIM locks, etc. The regulatory domain database 40 may manage negotiation of the change in MNOs and authorization of the change command. Presuming the change is authorized, the new MNO profile may be installed an activated by the new MNO server, or the regulatory domain server, etc. The old MNO profile is deactivated.

It will be appreciated that the various servers that may be involved in the re-provisioning processes may contact the certification server 14 for validating EUICC information and updating the records maintained by the certification server 14.

In one example embodiment, a factory reset (network or user-initiated) may by implemented using one of the above-described re-provisioning processes. During factory reset, the user may be provided with an option of selecting a new MNO/subscription if the old MNO profile (if any) is deactivated (subject to MNO change authorization rules).

It will also be understood that re-provisioning may occur prior to installation of an MNO active profile. For example, the certification server 14 or other system entity may be configured to provision the EUICC 12 with new key material, etc. In one embodiment, this may be part of a security change/upgrade. The certification server 14 may advertise the availability or necessity of a profile update to other entities in the system (e.g. device vendor or regulatory domain operator). If the device 10 connects to seek provisioning, for example through the device vendor and/or the regulatory domain operator, the new key material is also installed either by one of those entities or by referring the device 10 to the certification server 14. If device has an active MNO profile, the MNO may be notified, which may cause device (when connected to MNO network) to be re-provisioned with new certification-level (or other level) key material (either by redirecting to the certification server 14 or other provisioning entity, or by provisioning through the MNO).

Figure 5:
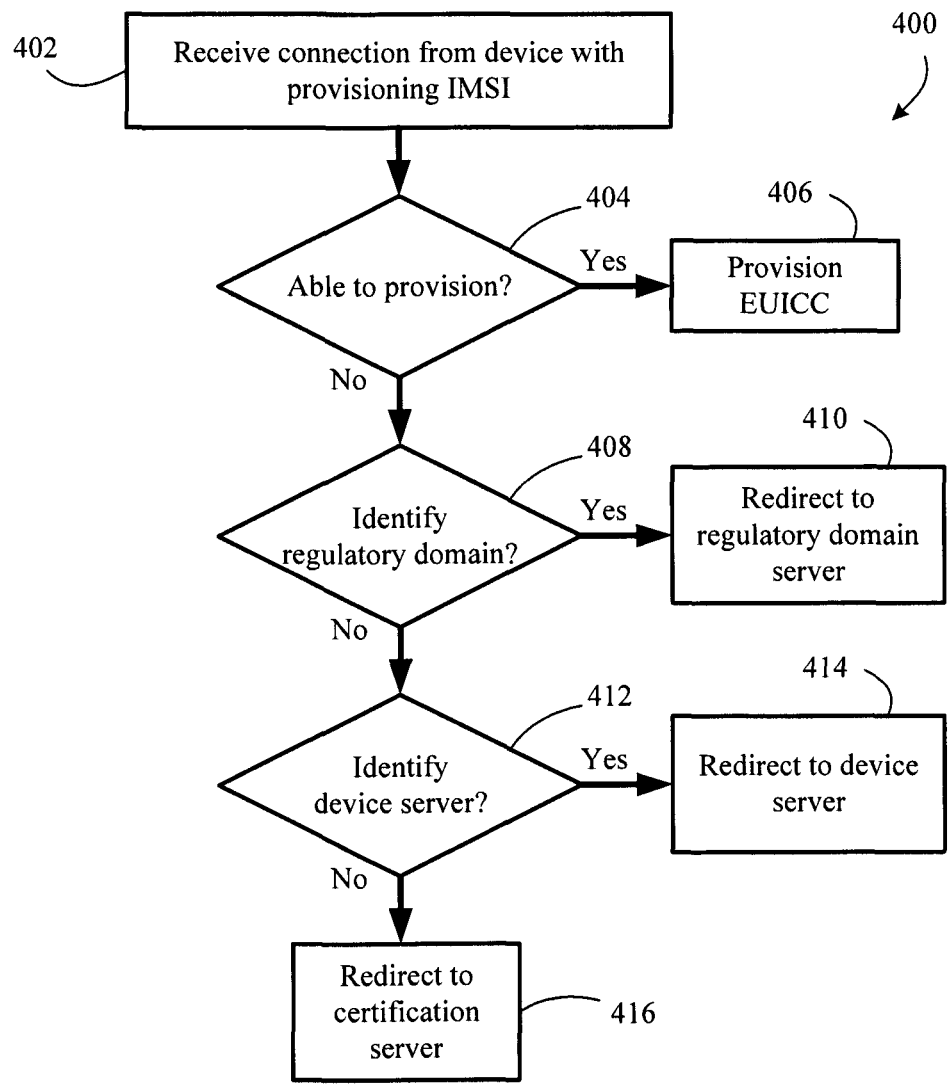
FIG. 5 shows, in flowchart form, an example method for IMSI-based provisioning of an EUICC.

Reference will now be made to FIG. 5, which shows, in flowchart form, another example method 400 of provisioning an EUICC. In this method 400, the device and, in particular, the EUICC, has a provisioning IMSI. That is, at some point during the certification or distribution process, the device was provisioned with an IMSI, such as a device-level IMSI, a regulatory domain IMSI, or a donor IMSI, that is not an active MNO IMSI. The IMSI may be identifiable as a provisioning IMSI on the basis that the MCC or MNC (or both) resolve to non-country codes or non-network carrier codes.

In operation 402, the mobile network receives a connection from an device that features a provisioning IMSI. Upon detecting the provisioning IMSI, the mobile network may be configured to block access to any services other than provisioning. For example, a name server may block access to any domain other than FQDNs associated with certification servers or provisioning servers. In this example, the mobile network may automatically route the connection to a local provisioning server for the MNO.

In operation 404, the local MNO provisioning server may determine whether it can provision a profile to the device. This may include querying the certification server, or other servers, in some embodiments to authenticate the EUICC. If the local MNO provisioning server is able to provision the EUICC, then in operation 406 it provides an active MNO profile to the EUICC.

If it cannot provision the device, then the local MNO provisioning server may determine whether it can identify the regulatory domain to which the wireless device may be referred, as indicated by operation 408. If it can, perhaps based upon contextual data provided by the wireless device and/or information obtained from the certification server, the SIM vendor server, or other such servers, then the wireless device is redirected to the identified regulatory domain server, as indicated by operation 410. The regulatory domain may also be identifiable based upon the MCC and/or MNC of the provisioning IMSI.

If the regulatory domain is not identifiable, then the local MNO provisioning server may attempt to identify a device vendor to which to refer the device, as indicated by operation 412. This may be identifiable using the provisioning IMSI if the MCC and/or MNC correspond to a device vendor. It may also be identifiable based upon device identifying information provided by the device to the server. If the local MNO provisioning server is identify a suitable device vendor server to which to refer the device then it does so in operation 414. Otherwise, it may redirect the device to the certification server, as indicated by operation 416, whereupon the device/EUICC may initiate a provisioning process anew.

Note that many of these functions and determinations may be implemented on other servers and/or proxied.

It will be appreciated that some embodiments of the foregoing process 400 involve triggering a provisioning process based upon a device having a provisioning IMSI. It will further be appreciated that, in some cases, the IMSI itself may help determine the entity to provision the device.

Certain adaptations and modifications of the described embodiments can be made. Therefore, the above discussed embodiments are considered to be illustrative and not restrictive.

What is claimed is:

1. A method of provisioning an embedded universal integrated circuit card (EUICC) in a wireless device with an active profile, wherein the active profile corresponds to an mobile network operator (MNO) subscription for service and includes an active profile international mobile subscriber identity (IMSI) and key material, the EUICC storing a fully-qualified domain name (FQDN) that resolves to a server, the method comprising:
  establishing an IP connection between the wireless device and the server;
  receiving, at the server, a provisioning request from the wireless device;
  querying a certification server database for a record associated with the EUICC;
  identifying, based on the record, an MNO provisioning server for provisioning the EUICC;
  redirecting the wireless device to the MNO provisioning server, from which the EUICC is provisioned the active profile,
  wherein the provisioning request includes geo-location information, and wherein the identifying further includes identifying the MNO provisioning server based upon the geo-location information.

2. The method claimed in claim 1, wherein establishing an IP connection includes establishing a non-cellular connection between a network and the wireless device, and providing IP connectivity to the wireless device via the non-cellular connection.

3. The method claimed in claim 2, wherein the non-cellular connection comprises one of a WiFi connection, an Ethernet connection, a Bluetooth connection, and a Zigbee connection.

4. The method claimed in claim 1, wherein the provisioning request comprises a request to access the FQDN.

5. The method claimed in claim 4, wherein the server associated with the FQDN comprises a regulatory domain server associated with a regulatory domain operator, and wherein the regulatory domain operator governs a regulatory domain that includes the MNO.

6. The method claimed in claim 5, wherein the regulatory domain includes a plurality of mobile network operators including the MNO.

7. The method claimed in claim 4, wherein the server associated with the FQDN comprises one of a regulatory domain server, a device installation server, and an MNO server.

8. The method claimed in claim 1, wherein the active profile comprises a new active profile, and wherein the wireless device includes an old active profile, and wherein the provisioning request comprises an MNO change command.

9. The method claimed in claim 8, further comprises receiving authorization from an old MNO server for a change to the new active profile with respect to the wireless device.

10. The method claimed in claim 1, wherein the geo-location information includes one of GPS data and cellular network identifier data.

11. A certification server, comprising:
  a processor;
  memory storing a plurality of records, each record storing a respective EUICC identifier and an associated certificate; and
  an authentication application stored in memory that, when executed, configures the processor to
    receive a query from a server regarding a wireless device containing an EUICC, the query including an identifier associated with the EUICC,
    select one of the plurality of records based on the received identifier matching the respective EUICC identifier, and
    send a reply to the server, wherein the reply includes information regarding an MNO provisioning server associated with the EUICC.

12. A regulatory domain server operated by a regulatory domain operator for a regulatory domain, wherein the regulatory domain includes a plurality of mobile network operators (MNO) each having a public land mobile network, the regulatory domain server comprising:
  a processor; and
  a memory storing records for embedded universal integrated circuit cards (EUICCs) associated with wireless devices;
  wherein the processor is configured to
    receive a provisioning request from a wireless device, the provisioning request including an EUICC identifier,
    determine whether the EUICC identifier matches one of the records stored in the memory and,
      if so, redirect the wireless device to a provisioning server for one of the MNOs within the regulatory domain based on the contents of the record matching the EUICC identifier, or,
      if not, query another server for provisioning information regarding the wireless device and receive a response thereto and redirect the wireless device based upon the response.

13. The regulatory domain server claimed in claim 12, wherein the another server comprises a certification server.

14. The regulatory domain server claimed in claim 2, wherein the provisioning request comprises an MNO change request.

15. The regulatory domain server claimed in claim 12, wherein the provisioning request includes geo-location information, and wherein the identifying further includes identifying the MNO provisioning server based upon the geo-location information.

16. The certification server claimed in claim 13, wherein the processor is to identify the MNO provisioning server associated with the EUICC.

17. The certification server claimed in claim 16, wherein the query includes geolocation data regarding the wireless device, and wherein identifying includes selecting the MNO provisioning server based on the geolocation data.

* * * * *